INVENTOR.
Max Haller

United States Patent Office 3,461,368
Patented Aug. 12, 1969

3,461,368
DIODE CONTROLLED EXCITER CIRCUIT FOR SYNCHRONOUS MOTORS
Max Haller, Wettingen, Switzerland, assignor to Aktien-gesellschaft Brown, Boveri & Cie, Baden, Switzerland, a joint-stock company
Filed Sept. 29, 1967, Ser. No. 671,639
Claims priority, application Switzerland, Oct. 18, 1966, 15,052/66
Int. Cl. H02p 5/28
U.S. Cl. 318—192                    4 Claims

ABSTRACT OF THE DISCLOSURE

A synchronous motor excited by diodes in which transformer means are provided on the exciter winding of the motor and also on a choke coil connected in the exciter line, the transformer means being interconnected such that an induced voltage occurring temporarily in the exciter winding is transmitted at the same value but in opposite direction to the choke coil.

---

The transformer means may be in the form of separate secondary windings inductively related to the windings of the exciter and choke coil, or the exciter and choke coil are interconnected by taps so that such windings function as auto-transformers.

The interconnected transformer means serve to prevent undesirable flow of direct current via the diodes during starting.

Excitation by means of diodes, as used for synchronous generators without slip rings, is becoming increasingly important also with synchronous motors without slip rings. Such motors are used for instance in environments where there is a risk of explosion. With synchronous motors excited by diodes it is difficult to obtain satisfactory starting, since as a result of the direct current flowing via the diodes a steady field is superimposed on the rotary field building up in the starting process, through which the asynchronous starting torque is weakened.

Devices are known for suppressing this steady field. These work in such a way that during the starting of the synchronous motor the direct current is interrupted. With motors without slip rings, co-rotating contactless switching devices are used.

The principal object of the present invention is to prevent, or at least to weaken considerably, the occurrence of a direct current and the excess voltages at the diodes during the starting of a synchronous motor. A solid pole or a damping winding in itself brings a reduction of these excess voltages and currents; in most cases, however, the reduction is not sufficient.

The invention provides a synchronous motor excited by diodes, in which in order to prevent, during starting, an undesired, temporary direct current via the diodes of the exciter circut, transformer means are provided on the exciter winding of the motor and on a choke coil in the exciter line and are connected together in such a way that an induced voltage occurring temporarily in the exciter winding is transmitted at the same value but in opposite direction to the choke coil.

Figure 1:
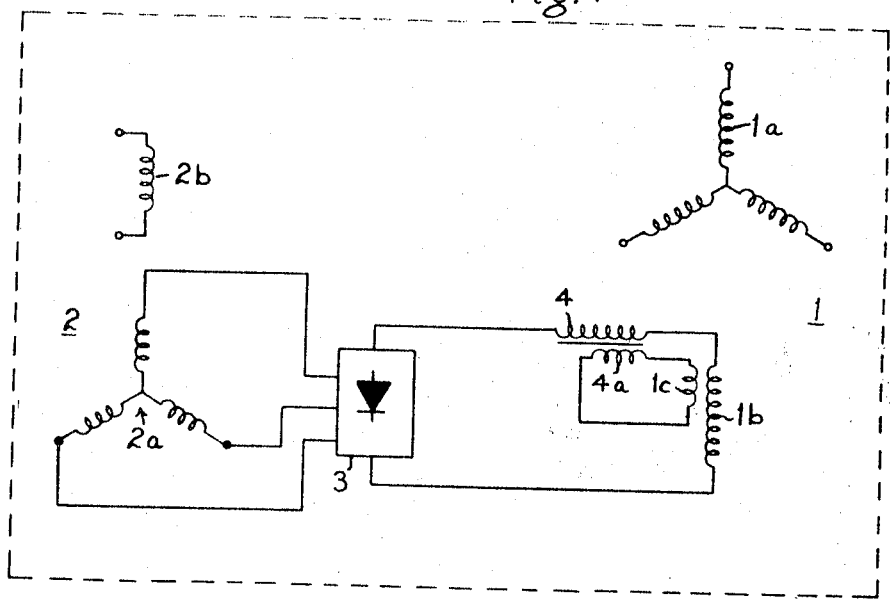
Figure 2:
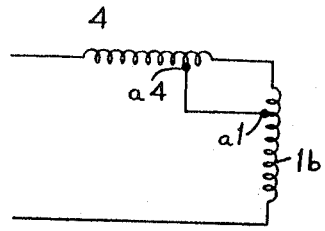

In the accompanying drawing, FIGURE 1 shows a basic circuit embodying the invention, and FIGURE 2 shows a variation.

In FIGURE 1, a synchronous motor 1 has a stator winding 1a and exciter winding 1b. Direct current is supplied via the exciter machine 2 and co-rotating rectifier 3. The exciter has a three-phase rotor winding 2a and an exciter winding 2b. The latter is supplied with direct current or alternating current.

A choke coil 4 is connected into the exciter current circuit. Transformer means in the form of secondary coils 1c and 4a are arranged on the exciter winding 1b and on the winding of the choke coil 4 respective'y. These secondary coils are connected together in such a way that a temporarily occurring induction voltage in the exciter winding 1b is transmitted to the choke coil at the same value but in the opposite direction. By suitable choice of the two transformation ratios it is possible to prevent the occurrence of a direct voltage at the rectifier 2.

If, during the starting process, i.e. with the rotor still slipping, a voltage is induced in its exciter winding which would produce excess voltages at the rectifier and a direct current in this rectifier, simultaneously a temporary induced voltage is transmitted to the choke coil. This transmitted voltage is contrary to the voltage occurring in the exciter windings, and of practically the same temporal course. The result is that no—or at least a greatly reduced—excess voltage is effective at the rectifier. The injurious direct current in the rectifier is also correspondingly reduced.

The arrangement can be simplified in accordance with FIGURE 2. The secondary windings 1c and 4a are omitted and corresponding tapping points a1 and a4 are arranged on the primary windings, i.e. the exciter winding 1b and the choke coil 4, which tappings are interconnected. Instead of via two separate secondary windings, the voltage transmission takes place in equivalent way with the exciter winding and choke coil acting as auto-transformers.

The choke coil 4 can be constructed as a toroidal coil and can be arranged coaxially around the motor shaft. As well as the resulting constructional advantage there is the further advantage that external magnetization influences on the toroidal coil are avoided.

I claim:
1. In a synchronous motor of the type wherein the exciter winding is excited via diodes in an exciter circuit the improvement wherein, in order to prevent during starting an undesired temporary direct current via the diodes in the exciter circuit, transformer means are provided on said exciter winding of said motor and also on a choke coil in said exciter circuit, said transformer means being interconnected such that an induced voltage occuring temporarily in said exciter winding is transmitted at the same value but in opposite direction to said choke coil.

2. A motor in accordance with claim 1, in which said exciter winding and said choke coil have respective tapping points which are connected together, whereby such exciter winding and choke coil function as auto-transformers.

3. A motor as claimed in claim 1, in which said choke coil and exciter winding are provided with respective transformer secondary windings which are connected together.

4. A motor as claimed in claim 1, in which said choke coil is toroidal and is coaxial with the shaft of the motor.

References Cited
UNITED STATES PATENTS

| 2,095,106 | 10/1937 | Stöhr | 318—192 XR |
| 2,350,195 | 5/1944 | Rypinski | 317—20 XR |
| 2,949,568 | 8/1960 | Dortort | 317—20 XR |
| 3,328,672 | 6/1967 | Park | 317—20 XR |

ORIS L. RADAR, Primary Examiner

G. Z. RUBINSON, Assistant Examiner

U.S. Cl. X.R.

317—20, 49, 50; 318—178